United States Patent
Clune et al.

(10) Patent No.: US 11,829,870 B2
(45) Date of Patent: Nov. 28, 2023

(54) DEEP REINFORCEMENT LEARNING BASED MODELS FOR HARD-EXPLORATION PROBLEMS

(71) Applicant: Uber Technologies, Inc., San Francisco, CA (US)

(72) Inventors: Jeffrey Michael Clune, San Francisco, CA (US); Adrien Lucas Ecoffet, Oakland, CA (US); Kenneth Owen Stanley, San Francisco, CA (US); Joost Huizinga, Emeryville, CA (US); Joel Anthony Lehman, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 886 days.

(21) Appl. No.: 16/696,893

(22) Filed: Nov. 26, 2019

(65) Prior Publication Data
US 2020/0166896 A1 May 28, 2020

Related U.S. Application Data

(60) Provisional application No. 62/771,522, filed on Nov. 26, 2018.

(51) Int. Cl.
*G06N 3/08* (2023.01)
*G06V 20/56* (2022.01)
(Continued)

(52) U.S. Cl.
CPC ............ *G06N 3/08* (2013.01); *G05D 1/0088* (2013.01); *G06N 3/006* (2013.01); *G06N 3/086* (2013.01);
(Continued)

(58) Field of Classification Search
CPC .... G06V 20/56; G05D 1/0088; G05D 1/0212; G05D 1/0221; G05D 2201/0213;
(Continued)

(56) References Cited

U.S. PATENT DOCUMENTS

| | | | |
|---|---|---|---|
| 11,243,532 B1 * | 2/2022 | Levihn | G06N 3/045 |
| 2018/0374359 A1 * | 12/2018 | Li | G08G 1/163 |

(Continued)

FOREIGN PATENT DOCUMENTS

| | | | | |
|---|---|---|---|---|
| WO | WO-2019023628 A1 * | 1/2019 | | B60W 30/10 |

*Primary Examiner* — Babar Sarwar
(74) *Attorney, Agent, or Firm* — Fenwick & West LLP

(57) ABSTRACT

A self-driving vehicle implements a deep reinforcement learning based model. The self-driving vehicle comprise one or more sensors configured to capture sensor data of an environment of the self-driving vehicle, a control system configured to navigate the self-driving vehicle, and a controller to determine and provide instructions to the control system. The controller implements a deep reinforcement learning based model that inputs the sensor data captured by the sensors to determine actions to perform by the control system. The model includes an archive storing states reachable by an agent in a training environment, each state stored in the archive is associated with a trajectory for reaching the state. The archive is generated by visiting states stored in the archive and performing actions to explore and find new states. New states are stored in the archive with their trajectories.

20 Claims, 7 Drawing Sheets

(51) Int. Cl.
  *G06N 3/086* (2023.01)
  *G06N 3/006* (2023.01)
  *G05D 1/00* (2006.01)
  *G05B 13/02* (2006.01)
  *B60W 30/095* (2012.01)

(52) U.S. Cl.
  CPC ......... *G06V 20/56* (2022.01); *B60W 30/0956* (2013.01); *G05B 13/027* (2013.01)

(58) Field of Classification Search
  CPC . G05B 13/027; B60W 30/0956; G06N 3/006; G06N 3/0454; G06N 3/08; G06N 3/086; G06N 3/008; G06N 3/084; G06N 3/044; G06N 3/045; G01C 21/3407; G01S 13/865; G01S 13/867; G01S 17/42; G01S 17/86; G01S 17/931; G01S 2013/9323; C02F 1/281; C02F 1/68; C02F 5/08
  See application file for complete search history.

(56) References Cited

U.S. PATENT DOCUMENTS

| | | | |
|---|---|---|---|
| 2019/0033085 A1* | 1/2019 | Ogale | G01C 21/3446 |
| 2019/0034794 A1* | 1/2019 | Ogale | G06N 3/08 |
| 2019/0049970 A1* | 2/2019 | Djuric | B60W 60/00276 |
| 2019/0049987 A1* | 2/2019 | Djuric | G06N 3/08 |
| 2019/0072965 A1* | 3/2019 | Zhang | G08G 1/161 |
| 2019/0072966 A1* | 3/2019 | Zhang | G05D 1/0088 |
| 2019/0072973 A1* | 3/2019 | Sun | B62D 15/0255 |
| 2019/0129436 A1* | 5/2019 | Sun | G06N 3/08 |
| 2019/0354786 A1* | 11/2019 | Lee | G06N 3/084 |
| 2019/0367019 A1* | 12/2019 | Yan | B60W 30/0956 |
| 2019/0367020 A1* | 12/2019 | Yan | G06F 18/295 |
| 2019/0384303 A1* | 12/2019 | Muller | G05D 1/027 |
| 2020/0065711 A1* | 2/2020 | Clément | B60W 40/10 |
| 2020/0142420 A1* | 5/2020 | Kusari | B60W 30/18163 |
| 2020/0159225 A1* | 5/2020 | Zeng | G05D 1/0212 |
| 2020/0174490 A1* | 6/2020 | Ogale | G06N 3/084 |
| 2021/0286360 A1* | 9/2021 | Ding | G05D 1/0221 |

* cited by examiner

DEEP REINFORCEMENT LEARNING BASED MODELS FOR HARD-EXPLORATION PROBLEMS

BACKGROUND

1. Technical Field

The subject matter described generally relates to artificial intelligence and machine learning, and in particular to deep reinforcement learning based techniques for solving hard-exploration problems.

2. Background Information

Artificial intelligence techniques such as machine learning are used for performing complex tasks, for example, natural language processing, computer vision, speech recognition, bioinformatics, recognizing patterns in images, and so on. Machine learning techniques such as supervised learning are used for solving problems such as translation of natural languages, object recognition in images. Machine learning techniques such as reinforcement learning are used for solving problems such as navigating a robot through an obstacle course, navigating a self-driving vehicle through a city, playing games such as Atari games, and so on.

Conventional reinforcement learning based techniques for performing these tasks receive rewards to determine whether an action taken was correct. However certain tasks are complex and have sparse distribution of rewards. Accordingly, rewards are either rarely received or even deceptive. For example, an action may result in a negative reward in the short term but may lead to higher reward in the long run. Conventional techniques for solving such problems perform poorly because these techniques take random actions that are unlikely to ever produce rewards, making it difficult to learn. These techniques perform worse when the rewards are deceptive, since maximizing rewards in the short term teaches an agent the wrong action to perform with respect to achieving a higher overall score. Many challenging real-world problems are both sparse and deceptive, for example, instructing a robot to cross an obstacle course, instructing a self-driving vehicle to go from a start location to a destination while driving through traffic, instructing a drone to deliver a package at a given location, and so on. As a result, conventional techniques for solving such problems either perform poorly or fail to perform such tasks.

SUMMARY

A deep reinforcement learning based model inputs sensor data to determine one or more actions to be performed by a control system. The control system may have one or more objectives, e.g., to achieve some reward, to meet some manufacturing quota, to reach a certain position, etc. The deep reinforcement learning based model includes an archive storing states reachable by an agent in a training environment, each state stored in the archive is associated with a trajectory for reaching the state. The archive is generated by visiting states stored in the archive and performing actions to explore and find new states. In the explore phase, the system explores the different states and trajectories for reaching these states. New states are stored in the archive with their trajectories. States are iteratively explored and stored in the archive. Promising states, for example, distant, hard to reach states are prioritized for the exploration. In the robustify phase, the model is made robust so that the model is able to retrace the trajectories in noisy environment, i.e., stochastic environments that are not deterministic and have slight random variations. Imitation learning techniques are implemented in the robustify phase. The deep reinforcement model may be implemented in the contexts of a computing system playing a virtual game, a drone flying in a real-world environment, a manufacturing facility, a self-driving vehicle, etc.

According to an embodiment, a self-driving vehicle is disclosed, the self-driving vehicle comprising: one or more sensors configured to capture sensor data of an environment of the self-driving vehicle; a control system configured to navigate the self-driving vehicle; and a controller configured to: receive, from one or more sensors on a self-driving vehicle, sensor data of an environment of the self-driving vehicle, determine a state of the environment based on the sensor data, determine an action to be performed by applying a trained model to the state of the environment, the trained model including an archive storing states reachable by an agent in a training environment, each state stored in the archive is associated with a trajectory for reaching the state, generate instructions according to the determined action, and providing the instructions for the control system to navigate the self-driving vehicle in the environment. The archive is generated by performing operations comprising: selecting a state from the archive, reaching, by the agent, the selected state, determining, from the selected state, one or more explore states reachable from the selected state by performing one or more actions at the selected state, determining, for each explore state, whether the explore state is already stored in the archive, and responsive to determining that an explore state is not already stored in the archive, storing the explore state in the archive.

Figure 1:
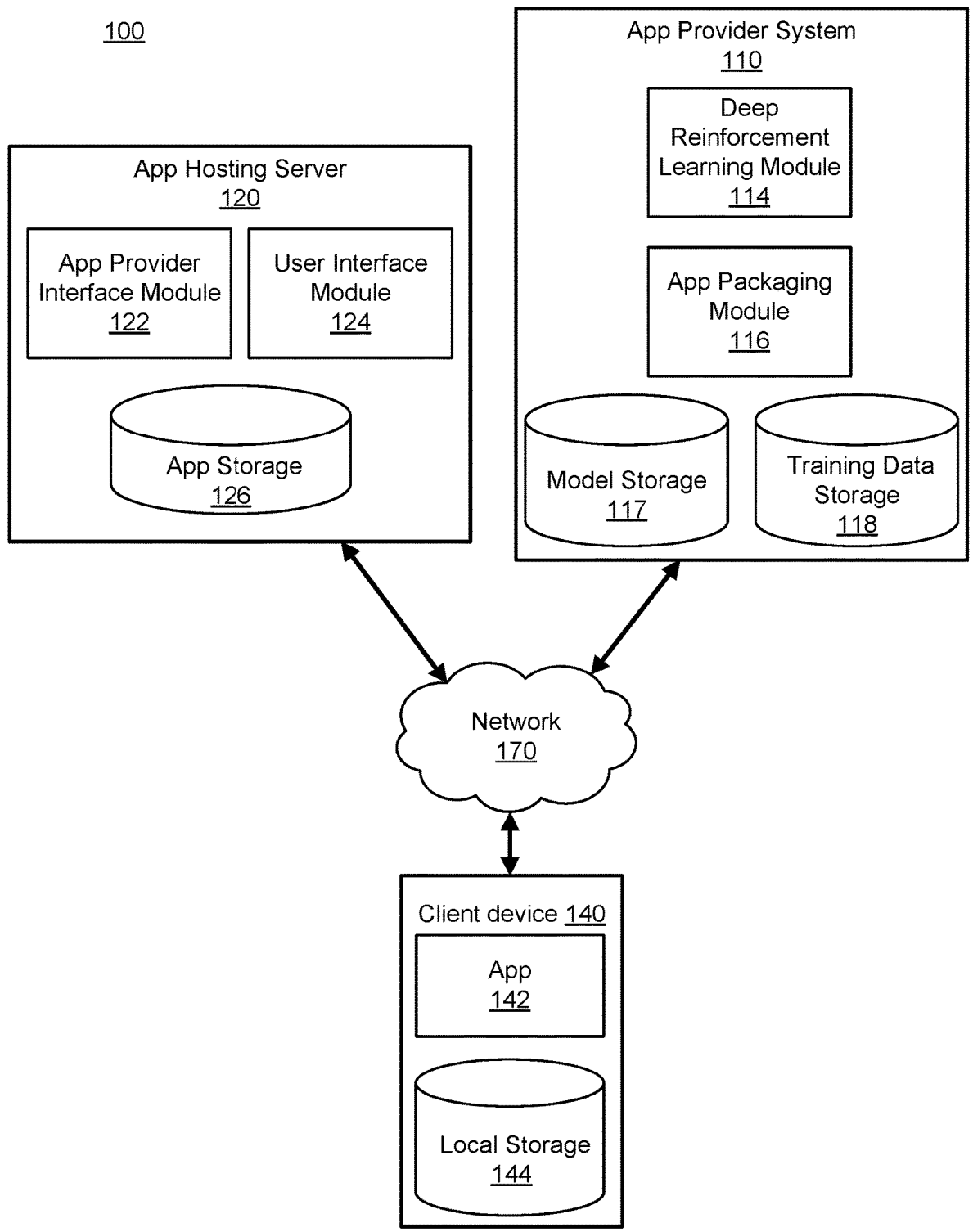
FIG. 1 illustrates a networked computing environment 100 in which deep reinforcement learning may be used, according to an embodiment.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

Reinforcement learning is a branch of machine learning in which an agent learns from interacting with an environment and receives a reward by acting in the environment. The agent learns by selecting actions that maximize the reward over time. For certain tasks, the agent receives a reward responsive to successfully completing the task. However, the agent may have to perform a sequence of actions to complete the task. The agent does not receive a reward for every action of the sequence that it performs. Such tasks are called hard-exploration tasks with sparse rewards since the agent receives rewards infrequently after performing several actions.

One weakness of conventional reinforcement learning techniques, for example, intrinsic motivation (IM) techniques is detachment, wherein the process does not maintain and utilize promising states that the system visited. According to these techniques, the agent follows a single trajectory at any given time and does not track other trajectories that were previously followed by the agent. It is likely that several of the trajectories previously followed by the agent may have led to interesting states. However, since the agent does not track these trajectories, the computational resources used for identifying these trajectories get wasted. Furthermore, any intrinsic reward previously present along these trajectories has now been consumed, making it unlikely that the agent will rediscover these trajectories naturally. One reason why an agent is unlikely to retrace a previously found trajectory is that these techniques introduce randomness in the actions performed. As a result, when an agent restarts the task, the agent never reaches a previously identified promising state due to randomness in determination of individual actions. As a result, the agent keeps revisiting the set of states close to the start state or only explores along a single long-distance trajectory. As a result, the agent is never able to train itself to perform correct actions in states that are distant from the start state, i.e., states that are reached after performing a long sequence of state transitions.

Furthermore, conventional techniques do not randomize actions efficiently. For example, a system based on IM may randomize actions too aggressively in portions of state space that were previously explored thereby making it difficult to retrace previous trajectories. The system based on IM may also not randomize actions in portions of the state space that is yet to be explored. This is so because these systems are unable to distinguish between portions of the state space that have already been explored and the portions that have yet to be explored. In contrast, embodiments of the invention track previously traced trajectories and are able to retrace previous trajectories and are able to effectively explore new portions of the state space as further described herein.

Embodiments of the invention explicitly store interesting states representing a variety of stepping stones encountered during exploration. The states and their trajectories are stored in an archive. The system remembers and returns to promising states, for example, distant, hard to reach states for exploration. By first returning to states before exploring from them, the system avoids spending resources repeatedly exploring states that are easily reachable, for example, states near the starting point. As a result, the system spends its resources in exploring the state space, thereby expanding its sphere of knowledge. Furthermore, because the system attempts to visit all reachable states, it is less susceptible to deceptive reward functions.

The system according to an embodiment, performs an explore phase and a robustify phase. In the explore phase, the system explores the different states and trajectories for reaching these states. The system identifies solutions that are brittle since the environment must be deterministic to allow the agent to retrace these trajectories. As a result, slight variations in the environment may cause the agent to fail and the agent may not be able to retrace a trajectory that previously was able to reach a final state. In the robustify phase, the system improves on the models used by the agent to make them robust so that the models are able to retrace the trajectories in noisy environments, i.e., environments that are not deterministic and have slight random variations.

Overall System Environment

FIG. 1 illustrates a networked computing environment 100 in which deep reinforcement learning may be used, according to an embodiment. In the embodiment shown in FIG. 1, the networked computing environment 100 includes an application provider system 110, an application provider server 120, and a client device 140, all connected via a network 170. An application is also referred to herein as an app. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the application 142 directly from the application provider system 110, rather than from the application hosting server 120.

The application provider system 110 is one or more computer systems with which the provider of software develops that software. Although the application provider system 110 is shown as a single entity, connected to the network 170, for convenience, in many cases it will be made up from several software developer's systems (e.g., terminals) which may or may not all be network-connected.

In the embodiment shown in FIG. 1, the application provider system 110 includes a deep reinforcement learning module 114, an application packaging module 116, a model storage 117, and training data storage 118. In other embodiments, the application provider system 110 contains different and/or additional elements. In addition, the functions may be distributed among the elements in a different manner than described.

The deep reinforcement learning module 114 trains models using processes and techniques disclosed herein. The deep reinforcement learning module 114 stores the trained models in the model storage 117. The app packaging module 116 takes a trained model and packages it into an app to be provided to client devices 140. Once packaged, the app is made available to client devices 140 (e.g., via the app hosting server 120).

The model storage 117 and training data storage 118 include one or more computer-readable storage-media that are configured to store models, for example, neural networks and training data, respectively. Although they are shown as separate entities in FIG. 1, this functionality may be provided by a single computer-readable storage-medium (e.g., a hard drive).

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 114 adds the app (along with metadata with some or all of the information provided about the app) to app storage 126. In some cases, the app provider information module 114 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a user interface using which the users can search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In an embodiment, a client device represents a computing system that is part of a larger apparatus, for example, a robot, a self-driving vehicle, a drone, and the like. In the embodiment shown in FIG. 1, the client device 140 includes an application 142 and local storage 144. The application 142 is one that uses a trained model to perform a task, such as one created by the application provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, 3G, 4G, etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
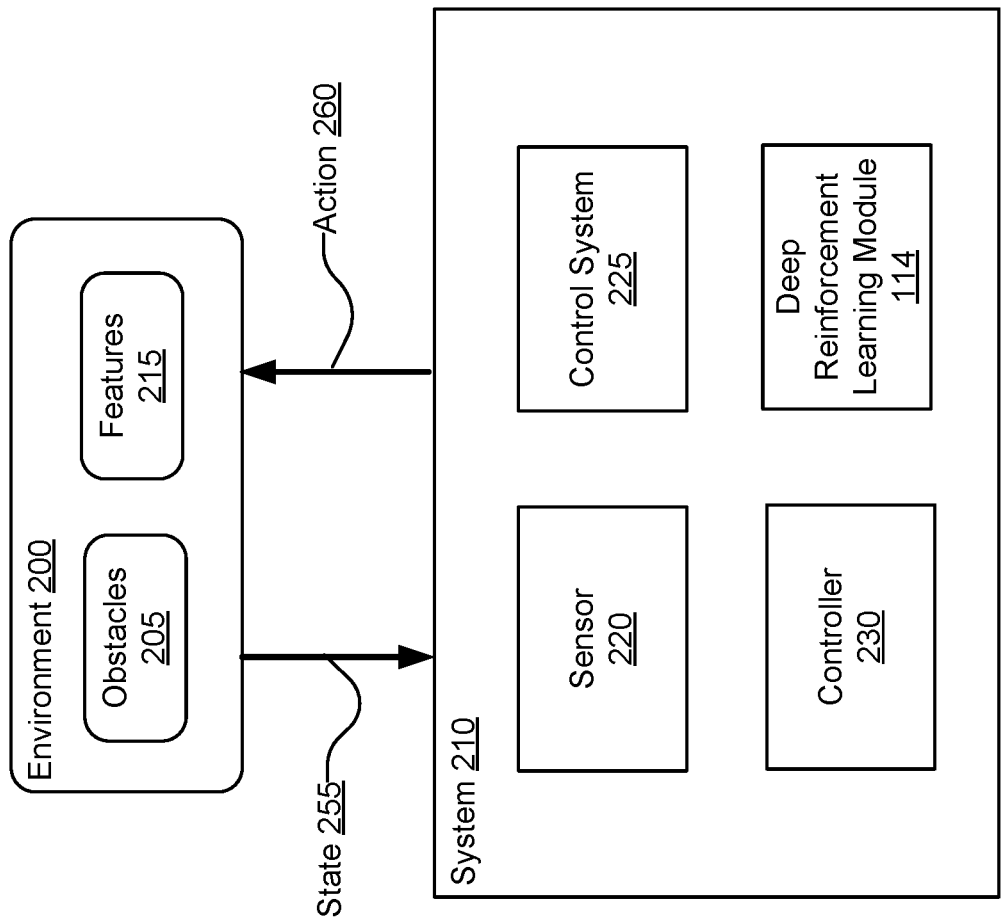
FIG. 2 illustrates a system for training and using deep reinforcement learning based models, according to one embodiment.

FIG. 2 illustrates a system for training and using deep reinforcement learning based models, according to one embodiment. The system 210 shown in FIG. 2 is a computing system that may be part of an apparatus or device, for example, a self-driving vehicle or a robot. The environment 200 represents the surroundings of the system 210. For example, the environment 200 may represent a geographical region through which a self-driving vehicle is travelling. Alternatively, the environment 200 may represent a maze or an obstacle course through which a robot is walking. As another example, the environment 200 may represent a setup of a game that the system 210 is playing, for example, an ATARI game.

The environment 200 may comprise objects that may act as obstacles 205 or features 215 that are detected by the system 210. Obstacles 205 may be defined as one or more surfaces that define the environment 200 physically. Obstacles 205 may include topographical features of surfaces, texture features of surfaces, temperature of surfaces, reflectivity of surfaces, state of matter of surfaces (e.g., solid, liquid, gas), other properties of surfaces, etc. The features 215 are defined as other things in the environment 200. Features 215 may include but not limited to one or more objects, one or more organisms, a temperature, a humidity, an amount of radiation, a sound source, etc. These features 215 may be determined by rules or by other models. For example, a yellow key in a virtual game has a yellow pixel. Example implementations of models include use of kernel matrices, neural networks, classifiers, etc. The system 210 comprises one or more sensors 220, a control system 225, a controller 230, and a deep reinforcement learning module 114. The system 210 uses the sensor 220 to sense the state 255 of the environment 200. The controller 230 applies a trained model to the sensor data (state of the environment 200) to determine an action 260 to perform. The controller 230 performs the action 260. Actions 260 may cause the state 255 of the environment to change.

The sensor 220 may be a camera that captures images of the environment. Other examples of sensors include a lidar, a camera, an infrared sensor, a motion sensor, a pressure sensor, an acoustic sensor, a thermometer, a barometer, a global positioning system (GPS), an inertial measurement unit (IMU), or any other type of sensor that can provide information describing the environment 200 to the system 210. The controller 230 uses models trained by the deep reinforcement learning module 114 to determine what action to take. The controller 230 sends signals (i.e., instructions) to the control system 225 for taking the action 260. The control system 225 controls one or more components of the system 210, e.g., to perform an action. The components controlled by the control system 225 depend on the system 210 being implemented.

For example, the system 210 may be a robot in an unfamiliar environment 200, e.g., the surface of Mars. The sensors 220 of a robot may identify one or more surfaces of the environment 200 that can define the obstacles 205. The sensors 220 may also identify anything else in the environment 200 as features 215. Features 215 may include but not limited to one or more objects, one or more organisms, a temperature, a humidity, an amount of radiation, a sound source, etc. The controller 230 of the robot invokes a model to determine a particular action to take, e.g., to move the robot, to move an object, to interact with another feature 215, etc. The controller 230 of the robot sends signals to the control system 225 to enact the action. In the example of moving an object, the signals can instruct movement of the arms of the robot to pick up the object and place it elsewhere.

As another example, the system 210 may be a self-driving vehicle attempting to navigate on roads as the environment 200. The sensors 220 of the self-driving vehicle may capture images of the surroundings to determine a location of the self-driving vehicle. As the self-driving vehicle drives through the region, the location of the vehicle changes and so do the surroundings of the vehicle change, i.e., the environment 200 changes with different states of obstacles 205 and features 215. The control system 225 may control various components of the self-driving vehicle including, but not limited to, acceleration, braking, steering, turn signaling, turning on/off lights, putting the self-driving vehicle into a gear, etc.

As another example, the system 210 is a system playing a game, for example, an ATARI game may use a screen capture device as a sensor 220 to capture an image representing the current configuration of the game and make some move that causes the configuration of the game to change. The control system 225 may control inputs into the game such as, but not limited to, buttons, joysticks, sliders, microphone, switches, mouse, keyboard, etc.

As another example, the system 210 is a drone. Example sensors 220 are similar to that of a self-driving vehicle. Moreover, the drone may have sensors 220 such as wind speedometer, altimeter, etc. The control system 225 navigates the drone to deliver an object, for example, a package to a location. Components that may be controlled by the control system 225 include one or more engines, one or more latches to drop objects, etc. The model helps the agent to determine what action to take, for example, for navigating to the right location, avoiding any obstacles that the drone may encounter, and dropping the package at the target location.

As another example, the system 210 manages a facility, for example, a chemical plant, a manufacturing facility, or a supply chain system. The sensors 220 monitor equipment used by the facility, for example, monitor the chemical reaction, status of manufacturing, or state of entities/products/services in the supply chain process. Actions that may be selected by the controller 230 include, for example, to control the chemical reaction, increase/decrease supply, and so on. The control system 225 may control various machinery to accomplish the particular action.

An action represents a move that the agent can make. An agent selects from a set of possible actions. For example, if the system 210 is configured to play video games, the set of actions includes running right or left, jumping high or low, and so on. If the system 210 is configured to trade stocks, the set of actions includes buying, selling or holding any one of an array of securities and their derivatives. If the system 210 is part of a drone, the set of actions includes increasing speed, decreasing speed, changing direction, and so on. If the system 210 is part of a robot, the set of actions includes walking forward, turning left or right, climbing, and so on. If the system 210 is part of a self-driving vehicle, the set of actions includes driving the vehicle, stopping the vehicle, accelerating the vehicle, turning left/right, changing gears of the vehicle, changing lanes, and so on.

A state represents a potential situation in which a controller 230 can find itself; i.e. a configuration in which the controller 230 (or the system/apparatus executing the agent, for example, the robot, the self-driving vehicle, the drone, etc.) is in relation to its environment 200. In an embodiment, the representation of the state describes the environment 200 as observed by sensors 220 of the system 210. For example, the representation of the state may include an encoding of sensor data captured by the sensors 220 received by the controller 230, i.e., the state represents what the controller 230 observes in the environment. In some embodiments, the representation of the state encodes information describing an apparatus controlled by the controller 230, for example, (1) a location of the apparatus controlled by the controller 230, e.g., (a) a physical location such as a position of a robot in an obstacle course or a location of a self-driving vehicle on a map, or (b) a virtual location such as a room in a computer game in which a character controlled by the agent is present; (2) an orientation of the apparatus controlled by the controller 230, e.g., the angle of a robotic arm; (3) the motion of the apparatus controlled by the controller 230, e.g., the current speed/acceleration of a self-driving vehicle, and so on.

The representation of the state depends on the information that is available in the environment 200 to the controller 230. For example, for a robot, the information available to a controller 230 controlling the robot may be the camera images captured by a camera mounted on the robot. For a self-driving vehicle, the state representation may include various types of sensor data captured by sensors 220 of the self-driving vehicles including camera images captured by cameras mounted on the self-driving vehicle, lidar scans captured by lidars mounted on the self-driving vehicle, and so on. If the controller 230 is being trained using a simulator, the state representation may include information that can be extracted from the simulator that may not be available in the real-world, for example, the position of the robot even if the position may not be available to a robot in the real world. The availability of additional information that may not be available in the real world is utilized by the explore phase to efficiently find solutions to the task.

Objects in the environment may be physical objects such as obstacles for a robot, other vehicles driving along with a self-driving vehicle. Alternatively, the objects in the environment may be virtual objects, for example, a character in a video game or a stock that can be bought/sold. The object may be represented in a computing system using a data structure.

A reward is the feedback by which the system measures the success or failure of an agent's 230 actions. From a given state, a controller 230 perform actions that may impact the environment 200, and the environment 200 returns the agent's 230 new state (which resulted from acting on the previous state) as well as rewards, if there are any. Rewards evaluate the agent's 230 action.

A policy represents the strategy that the controller 230 employs to determine the next action based on the current state. A policy maps states to actions, for example, the actions that promise the highest reward. A trajectory denotes a sequence of one or more actions that achieves a particular state. The trajectory may further include one or more intermediate states traversed along the way to reaching the particular state. For example, a trajectory to reach a state that is two meters in front of a self-driving vehicle might include an action of moving the self-driving vehicle two meters forward from the current state. A size of the trajectory may refer to the number of actions included in the trajectory, a number of intermediate states included in the trajectory, or some combination thereof.

In an embodiment, a controller 230 uses a trained model to select the action to be taken. The controller 230 inputs sensor data into the trained model to determine an action to be taken. The controller 230 proceeds with performing the determined action, e.g., via the control system 225. For example, the controller 230 may use a convolutional neural network to process the sensor data, for example, an image of the surroundings representing the environment. The convolutional neural network is configured to select the action to be performed in a given situation. The convolutional neural network may rank various actions by assigning a score to each action and the controller 230 selects the highest scoring action to act upon.

Figure 3:
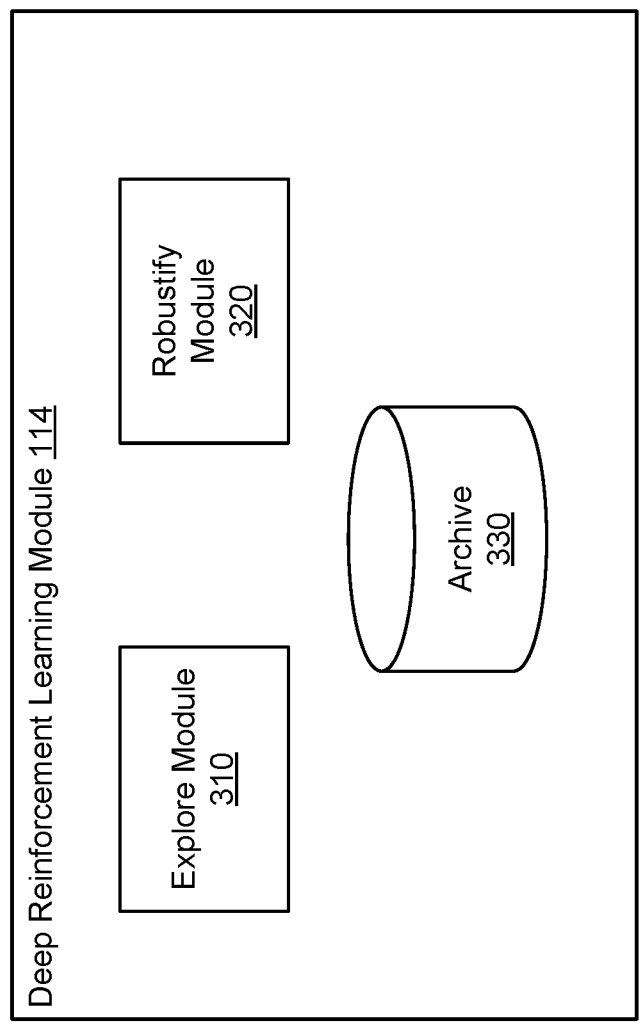
FIG. 3 illustrates the system architecture of a deep reinforcement learning module, according to one embodiment.

FIG. 3 illustrates the system architecture of the deep reinforcement learning module 114 of FIG. 1, according to one embodiment. The deep reinforcement learning module 114 comprises an explore module 310, a robustify module 320, and an archive 330. Other embodiments may include additional or fewer modules than those shown in FIG. 3. Functions indicated as being performed by a particular module may be performed by other modules than those indicated herein.

The explore module 310 builds a set of different states and trajectories that lead to them. The explore module 310 stores the states and trajectories in the archive 330. Exploration by the explore module 310 will be further described in FIG. 4. The robustify module 320 determines whether the models found are robust to noise, for example, whether the models are able to reach a desired destination in presence of noise. If the robustify module 320 determines that the models are not robust, the robustify module 320 makes them robust (a process referred to as robustifying, robustification, or a robustify phase) by training a deep neural network configured to follow the trajectories. The robustification by the robustify module 320 will be further described in FIG. 4.

In an embodiment, the robustify module 320 uses an imitation algorithm to robustify the models. The explore module 310 finds trajectories to specific states and provides the trajectories to the robustify module 320. The robustify module 320 uses a trajectory as a demonstration. The robustify module 320 can use one or more trajectories simultaneously. To obtain multiple trajectories, the system concurrently executes multiple independent instances of the exploration phase.

Overall Process

Figure 4:
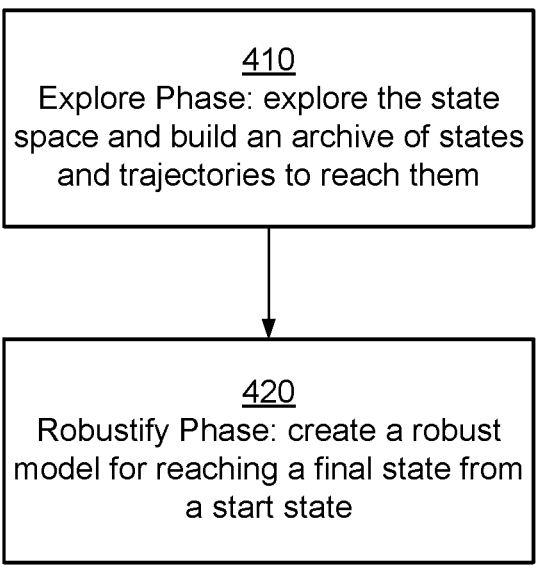
FIG. 4 is the overall process for deep reinforcement learning based training, according to one embodiment.

FIG. 4 is illustrates a process 400 for deep reinforcement learning based training of a model, according to one embodiment. The explore module 310 performs the explore phase by building 410 an archive of states. For each state stored in the archive 330, the explore module 310 also stores a trajectory to reach the state from a start state. In an embodiment, the trajectory for a particular state comprises a sequence of actions taken by an agent to reach from the start state to the particular state. As such, the start state has a null trajectory, i.e., no actions taken by an agent to reach the start state from the start state. The goal of the deep reinforcement learning module 114 is to train a model based on trajectories stored in the archive. The trained model is used by an agent to start from a starting state to reach a final state. In an embodiment, the model is configured to receive sensor data and determine an action to be performed based on the sensor data as well as the current state of the agent. The model may derive the current state of the environment based on the sensor data and determine the next action based on the current state of the environment and the current state of the agent.

Figure 5:
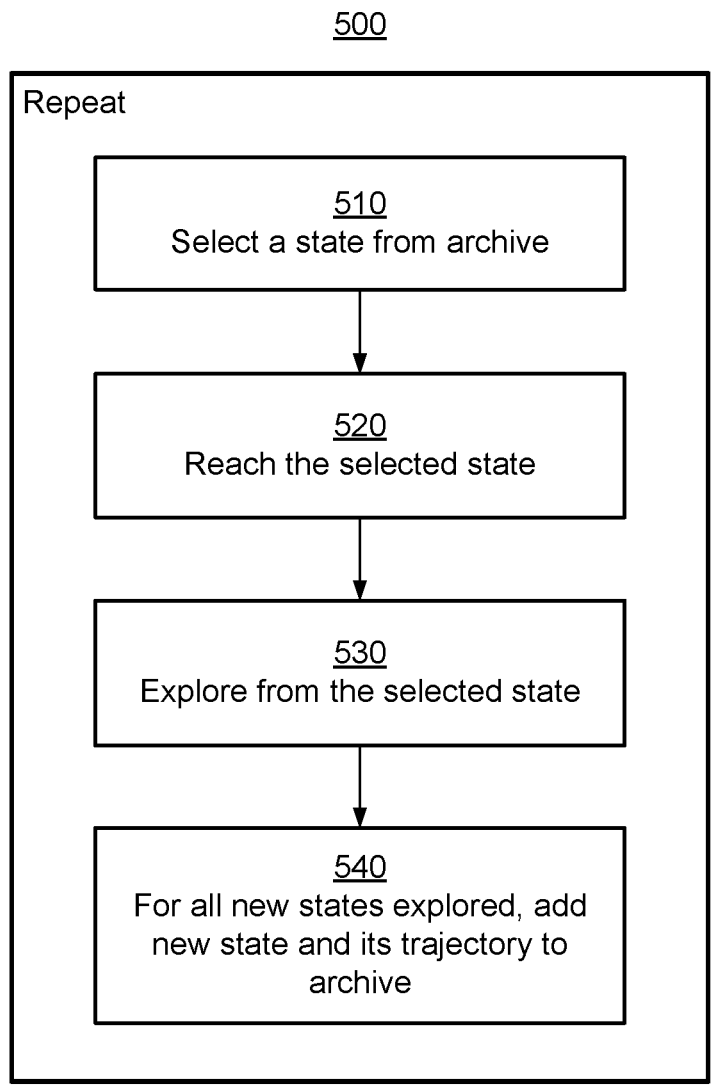
FIG. 5 is the process illustrating the details of the explore phase of the deep reinforcement learning based training, according to one embodiment.

FIG. 5 is a process 500 illustrating the details of the explore phase of the deep reinforcement learning based training, according to one embodiment. The explore module 310 builds an archive storing states reachable by an agent with associated trajectories to reach such states. The explore module 310 performs the exploration phase 410 by iterating (multiple iterations) following steps of the process 500, e.g., until one or more solutions are found. A solution is defined as some objective that can be achieved. An example solution in a game could be a score, an object, a reward, an accolade, an end stage, etc. An example solution in a facility could be a material with particular parameters, an undiscovered material, an optimal production efficiency rate, etc. The explore module 310 incrementally adds newly discovered states to the archive 330.

The explore module 310 selects 510 a state from the archive for further exploration. The explore module 310 selects 510 a state from the archive probabilistically. Each state stored in the archive may be assigned an explorative score indicating a likelihood that an agent will discover a new state from that state. The explorative score may be calculated according to a timestamp when a state was stored in the archive. Other implementations have the explorative score calculated according to a size of the trajectory, e.g., a number of actions, a number of intermediate states, etc. The explorative score may also be based on a number of other states reached from the state in previous exploration. For example, a lower explorative score is given to a state that has yielded many other states indicating that the state has been almost exhaustively explored. The explorative score may also reflect any features identified in a particular state. As an example, states with more features or more of one feature are scored higher, etc. The explorative score may also be calculated as a combination of factors, e.g., timestamp and distance of the trajectory. According to the explorative scores, the explore module 310 probabilistically chooses a state to explore from. According to this probabilistic methodology of selecting a state, the explore module 310 prioritizes promising states, for example, distant, hard to reach states for exploration. By first returning to states before exploring from them, the explore module 310 avoids spending resources repeatedly exploring states that are easily reachable, for example, states near the starting point. As a result, the explore module 310 spends its resources in exploring the state space, thereby expanding its sphere of knowledge. Furthermore, because the explore module 310 attempts to visit all reachable states, it is less susceptible to deceptive reward functions. The explore module 310 further retrieves an associated trajectory to reach the selected state.

The explore module 310 reaches 520 the selected state according to a trajectory describing a route to that state. The trajectory includes a sequence of zero or more actions used to reach a certain state. Zero actions in a trajectory is a null trajectory associated with a start state. Remaining states (not including the start state) include trajectories with one or more actions. The trajectory may further describe one or more other intermediate states reached along the way to reaching the intended state. The instructions for causing the agent to reach the selected state depend on the type of environment. The types of environment include a resettable environment, a deterministic environment, and a stochastic environment. The explore module 310 performs actions in the trajectory causing the agent to reach 520 the selected state.

In an embodiment, the agent operates in a resettable environment in which the state can be set to any particular state. In a resettable environment, the agent reaches the selected state by resetting the state of the agent to the selected state. For example, with a virtual game simulator, the agent can select a particular state of the virtual game and reset the particular state with the simulator.

In an embodiment, the agent operates in a deterministic environment. In these embodiments the system stores the trajectory as a sequence of actions that can be performed by the agent to reach a particular state. In a deterministic environment, the agent reaches the selected state by accessing the trajectory of the selected state from the archive and replaying the trajectory of the selected state. The agent executes the sequence of actions of the trajectory causing the agent to change states through each of the particular sequence of states. The agent determines the action to be performed to reach the next state in the sequence from any given state. Since the environment is deterministic, the agent is able to track all the states of the trajectory by taking the actions specified in the trajectory.

In other embodiments, the environment is non-deterministic and the agent uses machine learning based models, for example, a neural network to go from one state to another state to follow the trajectory. The neural network is trained to predict the right action to be performed so that the agent transitions from one state to another state. Alternatively, a machine learning based model may be used that is configured to receive sensor data and current state of the agent as input and predict scores for each action that can be taken by the agent. The agent uses the scores to select an action to perform to reach new and interesting states.

The explore module 310 explores 530 from the state by performing various possible actions in that state. The explore module 310 may randomly select the action performed. In some embodiments, the explore module 310 selects an action from a filtered set of actions that have yet to be performed at the current state. For example, the explore module 310 does not select a previously performed action. Doing so allows the explore module 310 to avoid already reached states, especially in deterministic environments. Following the action, the explore module 310 may transition from the selected state to another state. In some embodiments, the explore module 310 may identify features in the explored state. The other state may be previously archived or not previously archived. In a previously archived state, the explore module 310 may determine a trajectory that was performed to reach the state. This trajectory may include the initial trajectory used to reach 520 the selected state with the addition of the action performed during exploration 530. The explore module 310 may compare the newly determined trajectory against the archived trajectory stored with the previously reached state. The explore module 310 may replace the previously archived trajectory with the newly determined trajectory if the newly determined trajectory is shorter, e.g., less actions, less intermediate states, etc.

In some embodiments, the explore module 310 performs further exploration 530 from the state using a neural network that is trained to reach interesting states from a given state. This neural network is configured to help the explore module 310 during the exploration phase to find new states from a given state. The neural network is trained based on a measure of its success at finding new states. Accordingly, the neural network may be rewarded for finding new states. In an embodiment, the system determines a score of a state, the score indicative of the state being a valid new state or an interesting new state explored. The neural network training process uses the score to validate and rank new states generated while exploring from a given input state. In various embodiments, this neural network is trained using techniques such as reinforcement learning, an evolutionary strategy, or another neural network training technique.

If the explore module 310 reaches a new state not previously archived, the explore module 310 stores 540 the new state in the archive. For each of the new states, the explore module 310 also stores the trajectory for reaching the selected state. This trajectory may include the initial trajectory used to reach 520 the selected state with the addition of the action performed during exploration 530. The explore module 310 may also assign a timestamp indicating when the state was logged in the archive. The explore module 310 may also determine a score for the new state according to timestamp of archive, trajectory, features, previous exploration, or any combination thereof. The explore module 310 may consider a trajectory T1 as better than another trajectory T2 if T1 takes fewer actions to reach the destination state compared to T2. In some embodiments, the explore module 310 prioritizes higher reward trajectories over trajectories with fewer actions.

Referring back to FIG. 4, the robustify module 320 makes 420 the trained model robust. The process of robustifying produces deep neural network policies that allow an agent to reliably reach a final state from a start state in presence of noise in the environment. Accordingly, the agent is able to reach a final state even if there are variations in the environment causing the environment to be slightly different from the environment used during the exploring phase.

In an embodiment, the robustify module 320 evaluates the trained model to determine whether the trained model is already robust and can handle noise in the environment. If the robustify module 320 determines that the trained model is robust, the robustify module 320 deploys the trained model without spending resources to make the model further robust. The model is trained to perform the state transitions specified in the trajectory of a state in the archive representing the transition from start state to the final state. In alternative embodiments, the robustify module 320 assumes that the trained model based on the trajectories is not robust and proceeds with the steps for making it robust. If the exploration phase used a goal-conditioned policy in the exploration phase, the robustify module 320 may assume that the trajectories are robust and does not test the trained model for robustness.

In an embodiment, the robustify module 320 robustifies the model using imitation learning based technique. There are various imitation learning based techniques that can be utilized. An example imitation based learning technique uses trajectories from start state to final states as demonstrations. The robustify module 320 lets each training episode start from a state in a demonstration. Early on in training, the agent begins every episode near the end of the demonstration. Once the agent is able to beat or at least tie the score of the demonstration on the remaining part of the game in at least 20% of the rollouts, the robustify module 320 keeps moving the starting point back in time. The robustify module 320 keeps moving the start state backwards until the agent is starting from a start state of the task, for example, start state of a game, start state of a robot, and so on. Once the agent is able to use the model to start processing at the start state and reach the end state of the task, the model is a robust trained model. By slowly moving the starting state from the end of the demonstration to the beginning, the robustify module 320 ensures that at every point the agent faces an easy exploration problem where it is likely to succeed, since it has already learned to solve most of the remaining game. The explore module 310 generates several demonstrations for the robustify module 320 to use for creating a robust model. Other imitation learning based techniques that can be used by the robustify module 320 include generative adversarial imitation learning (GAIL) and deep Q-learning from demonstrations. These imitation learning techniques are listed as examples and the techniques disclosed are not limited by these examples. The robustify module 320 module can use any learning techniques that can train a robust model from given example trajectories.

In an embodiment, the robustify module 320 generates a neural-network based model using the trajectories stored in the archive. The neural-network based model is configured to receive an encoded representation of sensor data and predict an action to be performed based on the input sensor data.

In an embodiment, the deep reinforcement learning module 114 uses a simulator for building the archive and/or training the model. The simulator is configured to simulate actions taken by the agent. The simulator is configurable and can be configured to act in a deterministic mode to simulate a deterministic environment or a stochastic mode to simulate a stochastic environment. In deterministic mode, the simulator repeats a particular state transition given an action performed by the agent independent of the time that the agent performs the action or the number of times the agent performs the action. In the stochastic mode, the state transition performed by the simulator varies according to a distribution. Accordingly, if the agent is in state S1 and performs an action, the agent may reach different states at different times or when the agent repeatedly performs the action in that state. In an embodiment, the simulator conforms to certain distribution of state transitions and the parameters of the distribution can be configured to achieve different levels of robustification of the models. The simulator may further be a resettable environment allowing the agent to reach the states by resetting the environment to the state.

The explore module 310 uses the simulator in the deterministic mode for building the archive. The robustify module 320 switches to training the model using the simulator in stochastic mode. The stochastic mode varies the environment in a random manner based on certain pre-specified distributions. As a result, the resulting trained model is robust and can handle noise in the environment. The simulator simulates the state space of a particular context. For example, within the context of a game, the simulator simulates the game. In examples with directing a vehicle or drone, the simulator simulates the vehicle or the drone in a real-world environment.

In an embodiment, the system training the model is different from the system where the model is deployed for execution. For example, the model may be trained using a simulator in an offline mode but deployed in a robot or a self-driving vehicle during execution time. The system that trains the model provides the trained model to a target system. The target system comprises a new agent that executes the trained model. In an embodiment, the system that trains the model provides the trained model to the target system by transmitting parameters of the trained model. The system may also transmit instructions for executing the model to the target system.

Figure 6:
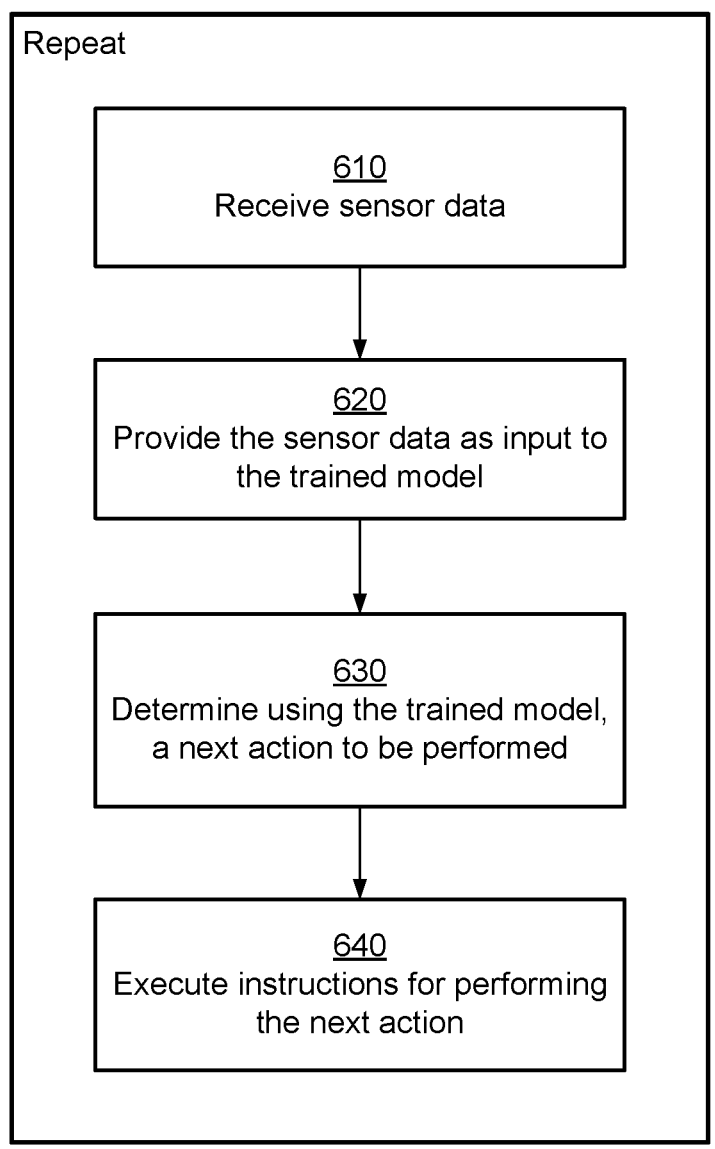
FIG. 6 is the process illustrating the details of the execution of a trained model, according to one embodiment.

FIG. 6 illustrates a process 600 executing a trained model, according to one embodiment. The target system (e.g., the system 210) that executes the trained model starts execution of the agent at a start state and repeats the following steps until it reaches a final state. The following steps are performed by the agent (e.g., the controller 230) of the target system. The agent receives 610 sensor data (e.g., from sensors 220) describing environment of the agent. The agent provides 620 the sensor data as input to the trained model. The agent determines 630 using the trained model, a next action to be performed. The agent executes 640 instructions for performing the next action (e.g., via the control system 225). These steps are repeated by the agent until the agent reaches a final state. The final state can be a state where one or more solutions have been achieved. The final state may alternatively be a determined state in the state space that is the overall object, e.g., in a maze, a game, etc.

In an embodiment, the deep reinforcement learning module 114 transforms the sensor data to reduce the number of potential states that can be reached from any given state. In an embodiment, the deep reinforcement learning module 114 maps a plurality of similar states to one state thereby reducing the number of potential states to explore. This reduces the computational complexity of the state space exploration tasks by reducing the number of states to a smaller number of interesting states. For example, assume that the actions cause a change in an image displayed on a screen. The deep reinforcement learning module 114 transforms the image by aggregating values of a plurality of adjacent pixels to determine new pixel values. The aggregating operation may simply determine an average of values over a plurality of adjacent pixels. As a result, the deep reinforcement learning module 114 creates a lower resolution image by aggregating adjacent pixel values, thereby reducing the search space to a lower dimensional space. For example, an image of 10000×10000 pixels may be reduced to 100×100 pixels, thereby reducing the number of potential states significantly. As a result, the number of corresponding actions that perform these state transitions are also reduced.

In other embodiments, the deep reinforcement learning module 114 may receive other types of sensor data, for example, lidar scans, camera images, infra-red scans, sound input, and so on and apply similar aggregation operation (e.g., averaging values) across the data points of the sensor data to transform the sensor data to lower dimensional data, thereby reducing the state complexity.

In another embodiment, the deep reinforcement learning module 114 reduces the complexity of the sensor data by performing sampling. For example, if the deep reinforcement learning module 114 receives sensor data representing intensity of sound received at 100 times per second, the deep reinforcement learning module 114 takes an average of the values received over each time interval that is 1 second long to reduce the number of data values by a factor of 100.

In an embodiment, the deep reinforcement learning module 114 extracts features from the sensor data. The features are determined based on domain knowledge associated with a problem that is being solved by the agent. For example, if the agent is playing an Atari game, the extracted features may represent specific objects that are represented by the user interface of the game. Similarly, if the agent is navigating a robot, the features may represent different objects in the environment that may act as obstacles. If the agent is navigating a self-driving vehicle, the features may represent other vehicles driving on the road, buildings in the surroundings, traffic signs, lanes of the road and so on. The reduction of the complexity of the state space improves the computational efficiency of the processes although given sufficient computational resources, the process can be executed with the original set of states.

Computing System Architecture

Figure 7:
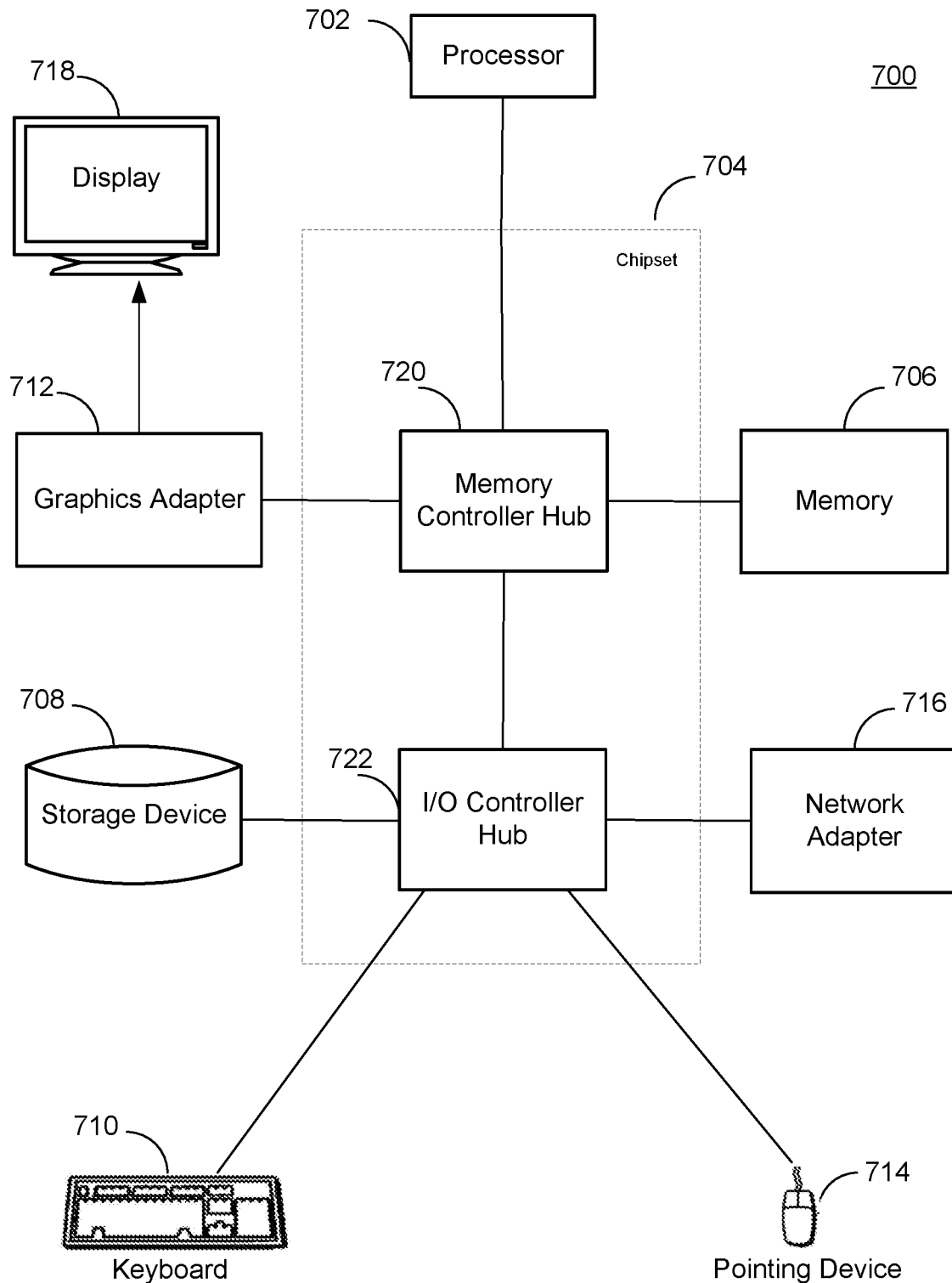
FIG. 7 is a high-level block diagram illustrating an example of a computer suitable for use in the system environment of FIG. 1-2, according to one embodiment.

FIG. 7 is a high-level block diagram illustrating an example computer 700 suitable for use as a client device 140, application hosting server 120, or application provider system 110. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks (e.g., network 170).

The types of computers used by the entities of FIG. 1 can vary depending upon the embodiment and the processing power required by the entity. For example, the application hosting server 120 might include a distributed database system comprising multiple blade servers working together to provide the functionality described. Furthermore, the computers can lack some of the components described above, such as keyboards 710, graphics adapters 712, and displays 718.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
   receiving, from one or more sensors on a self-driving vehicle, sensor data describing an environment of the self-driving vehicle relative to the self-driving vehicle;
   determining a state of the environment and a state of the self-driving vehicle based on the sensor data, the state of the self-driving vehicle comprising one or more of a location, an orientation, or a motion of the self-driving vehicle in the environment;
   applying a trained model to the state of the environment and the state of the self-driving vehicle to determine a trajectory of the self-driving vehicle and an action to be performed by the self-driving vehicle to cause the self-driving vehicle to travel along the trajectory, the trained model including an archive storing states of vehicles reachable by an agent in a training environment, each of the states stored in the archive comprises one or more of a location, an orientation, or a motion of a vehicle associated with a trajectory for reaching the state, each of the states stored in the archive assigned an explorative score indicating a likelihood that the agent will discover a new state that is not stored in the archive from the state that is stored in the archive, the archive generated by performing operations comprising:
      selecting a state from the archive based on the explorative scores of one or more states in the archive,
      reaching, by the agent, the selected state,
      determining, from the selected state, one or more explore states reachable from the selected state by performing one or more actions at the selected state,
      determining, for each explore state, whether the explore state is already stored in the archive, and
      responsive to determining that an explore state is not already stored in the archive, storing the explore state in the archive; and
   instructing the self-driving vehicle to operate in the environment according to the determined action.

2. The computer-implemented method of claim 1, wherein the agent is another self-driving vehicle in a real-world environment, wherein the agent has one or more sensors configured to detect the environment as sensor data.

3. The computer-implemented method of claim 1, wherein the agent is a simulated vehicle in a simulated real-world environment.

4. The computer-implemented method of claim 3, wherein a simulator is used for building the archive and training the model, wherein the simulator is configured to act in a deterministic mode and a stochastic mode, wherein the simulator is used in the deterministic mode for building the archive, and wherein the simulator is used in the stochastic mode for training the model.

5. The computer-implemented method of claim 1, wherein determining the state of the environment based on the sensor data comprises transforming the sensor data and identifying the state corresponding to the transformed sensor data.

6. The computer-implemented method of claim 5, wherein transforming the sensor data comprises extracting one or more features of the environment from the sensor data.

7. The computer-implemented method of claim 1, wherein the training environment is a resettable environment, wherein reaching the selected state by the agent comprises:
resetting the state of the agent to the selected state.

8. The computer-implemented method of claim 1, wherein the training environment is a deterministic environment, wherein reaching the selected state by the agent comprises:
accessing a trajectory of the selected state from the archive; and
replaying the trajectory of the selected state by a sequence of actions corresponding to the trajectory.

9. The computer-implemented method of claim 1, wherein the training environment is a stochastic environment, wherein the model is a first model, wherein reaching the selected state by the agent comprises:
training a second model to follow the trajectory of the selected state; and
executing the second model to follow the trajectory.

10. The computer-implemented method of claim 1, wherein the archive is generated by performing the operations over multiple iterations.

11. The computer-implemented method of claim 1, wherein storing the explore state in the archive comprises:
determining a trajectory for the explore state based on the trajectory for the selected state and one or more actions performed to reach the explore state; and
storing the trajectory for the explore state in association with the explore state in the archive.

12. The computer-implemented method of claim 1, wherein the operations further comprise:
responsive to determining that an explore state is already stored in the archive, accessing a previously stored trajectory associated with the explore state from the archive;
determining a new trajectory for the explore state based on the trajectory for the selected state and one or more actions performed to reach the explore state from the selected state;
comparing the previously stored trajectory to the new trajectory; and
responsive to determining that the new trajectory is shorter than the previously stored trajectory, replacing the previously stored trajectory with the new trajectory in the archive.

13. The computer-implemented method of claim 1, wherein the model is trained based on trajectories of states stored in the archive.

14. The computer-implemented method of claim 13, wherein the model is trained using an imitation learning based technique, the imitation based learning technique evaluating one or more demonstrations of trajectories from a start state to a final state.

15. The computer-implemented method of claim 13, wherein the model is a neural network.

16. The computer-implemented method of claim 1, wherein the explorative score for a state stored in the archive is based on a timestamp when the state was stored in the archive.

17. The computer-implemented method of claim 1, wherein the explorative score for a state stored in the archive is based on a size of the trajectory of the state.

18. The computer-implemented method of claim 1, wherein the explorative score for a state stored in the archive is based on one or more features in the state.

19. A self-driving vehicle comprising:
one or more sensors configured to capture sensor data of an environment of the self-driving vehicle relative to the self-driving vehicle;
a control system configured to navigate the self-driving vehicle; and
a controller configured to:
receive, from the one or more sensors on a self-driving vehicle, sensor data of the environment of the self-driving vehicle relative to the self-driving vehicle,
determine a state of the environment and a state of the self-driving vehicle based on the sensor data, the state of the self-driving vehicle comprising one or more of a location, an orientation, or a motion of the self-driving vehicle in the environment,
applying a trained model to the state of the environment and the state of the self-driving vehicle to determine a trajectory of the self-driving vehicle and an action to be performed by the self-driving vehicle to cause the self-driving vehicle to travel along the trajectory, the trained model including an archive storing states of vehicles reachable by an agent in a training environment, each of the states stored in the archive comprises one or more of a location, an orientation, or a motion of a vehicle associated with a trajectory for reaching the state, each of the states stored in the archive assigned an explorative score indicating a likelihood that the agent will discover a new state that is not stored in the archive from the state that is stored in the archive, the archive generated by performing operations comprising:
selecting a state from the archive based on the explorative scores of one or more states in the archive,
reaching, by the agent, the selected state,
determining, from the selected state, one or more explore states reachable from the selected state by performing one or more actions at the selected state,
determining, for each explore state, whether the explore state is already stored in the archive, and
responsive to determining that an explore state is not already stored in the archive, storing the explore state in the archive;
generate instructions according to the determined action, and
providing the instructions to the control system to operate the self-driving vehicle in the environment.

20. A non-transitory computer readable medium storing instructions that when executed by one or more computer processors, cause the one or more computer processors to perform steps comprising:

receiving, from one or more sensors on a self-driving vehicle, sensor data describing an environment of the self-driving vehicle relative to the self-driving vehicle;

determining a state of the environment and a state of the self-driving vehicle based on the sensor data, the state of the self-driving vehicle comprising one or more of a location, an orientation, or a motion of the self-driving vehicle in the environment;

applying a trained model to the state of the environment and the state of the self-driving vehicle to determine a trajectory of the self-driving vehicle and an action to be performed by the self-driving vehicle to cause the self-driving vehicle to travel along the trajectory, the trained model including an archive storing states of vehicles reachable by an agent in a training environment, each of the states stored in the archive comprises one or more of a location, an orientation, or a motion of a vehicle associated with a trajectory for reaching the state, each of the states stored in the archive assigned an explorative score indicating a likelihood that the agent will discover a new state that is not stored in the archive from the state that is stored in the archive, the archive generated by performing operations comprising:

selecting a state from the archive based on the explorative scores of one or more states in the archive, reaching, by the agent, the selected state, determining, from the selected state, one or more explore states reachable from the selected state by performing one or more actions at the selected state, determining, for each explore state, whether the explore state is already stored in the archive, and responsive to determining that an explore state is not already stored in the archive, storing the explore state in the archive; and instructing the self-driving vehicle to operate in the environment according to the determined action.

* * * * *